United States Patent [19]

Leinweber

[11] 4,346,367
[45] Aug. 24, 1982

[54] CIRCUIT FOR CONVERTING BINARY DIGITAL SIGNALS INTO PSEUDOTERNARY A.C. PULSES

[75] Inventor: Walter Leinweber, Nuremberg, Fed. Rep. of Germany

[73] Assignee: TE KA DE Felten & Guilleaume Fernmeldeanlagen GmbH, Nuremberg, Fed. Rep. of Germany

[21] Appl. No.: 92,945

[22] Filed: Nov. 9, 1979

[30] Foreign Application Priority Data

Nov. 18, 1978 [DE] Fed. Rep. of Germany ....... 2850129

[51] Int. Cl.³ ............................................ H03K 13/24
[52] U.S. Cl. ............................................ 340/347 DD
[58] Field of Search .................. 340/347 DD; 375/17, 375/18, 19

[56] References Cited

U.S. PATENT DOCUMENTS 3,233,236  2/1966  Katzenstein ................. 340/347 DD
3,502,810  3/1970  Aaron ................................. 375/17
3,622,983  11/1971  Deregnaucourt ..................... 375/17

FOREIGN PATENT DOCUMENTS 2605919  8/1976  Fed. Rep. of Germany ........ 375/17

*Primary Examiner*—Charles D. Miller
*Attorney, Agent, or Firm*—Michael J. Striker

[57] ABSTRACT

A binary coded signal is converted into pseudoternary coded form not by a complicated amplitude-modulation technique, but instead by application to a combination of flip-flops and logic gates. A clock pulse train, to which the binary coded signal is phase synchronized, is used to generate component pulse trains some of whose signal elements have only one half the duration of the bits of the binary coded signal. These component pulse trains are then combined to form the pseudoternary coded signal, in which some bits of the binary signal are represented by combinations of signal elements each having only half the bit duration and different respective ternary logic levels.

4 Claims, 3 Drawing Figures

CIRCUIT FOR CONVERTING BINARY DIGITAL SIGNALS INTO PSEUDOTERNARY A.C. PULSES

BACKGROUND OF THE INVENTION

The present invention relates to the conversion of binary digital signals having definite bit transmission rates into pseudoternary A.C. pulses.

In many situations in communications technology, transmitting and receiving stations are connected together by carrier-signal long-distance cables. Such a cable may, for example, comprise a coaxial pair surrounded by a plurality of symmetrical wire pairs. Each of the, e.g., sixteen wire pairs forms a side circuit and respective pairs of side circuits are connected together each to form a spiral quad. By center-tapping the side-circuit transformers, the eight spiral quads are imparted phantom-circuit operation.

The eight phantom circuits, due to poor crosstalk characteristics as between the phantom and side circuits are typically utilized only for low-frequency transmissions, e.g., for low-frequency audio transmissions or as service lines.

When establishing a digital transmission network, it is desirable to use as the transmission medium the carrier-signal long-distance cables already present. It is possible to simultaneously transmit analog signals modulated onto a carrier on the side circuits and digital signals on the phantom circuits, in the same frequency range. However, then, due to the poor crosstalk characteristics of the cable, the carrier-modulated analog signals are subject to distortion attributable to the digital signals. One can avoid this problem, by transmitting the digital signals at a frequency not the same as, but instead higher than the frequency range utilized for transmission of the analog signal-modulated carrier signal. However, then a compromise must be found between, on the one hand, the increase of cable attenuation with increasing frequency and, on the other hand, the transmission-level decrease needed in the lower frequency range.

On account of the transmitting properties of carrier-signal cable of the type in question, satisfactory use of the side circuits for transmission of the analog signal-modulated carrier and of the phantom circuits for transmission of the digital signals (e.g., in accordance with data transmission scheme PCM 30D) becomes possible if the transmitted power density spectrum of a 2048 kbit/sec PCM signal is shifted out of the 0 to 2 MHz frequency range of the baseband into a frequency range of 1 to 3 MHz. If the converted-frequency PCM signal thusly employed is, for example, a pseudoternary digital signal, then such signal will exhibit a distinct spectral maximum at a frequency equal to one half the bit transmission rate of the original signal, i.e., a maximum at 1024 kbits/sec. A pseudoternary signal, it will be understood, is a signal capable of assuming three distinct values, but with its three values utilized merely to convey information represented or representable by only two values, i.e., a ternary signal used to represent the bits of a binary signal.

Such conversion of a binary signal into a pseudoternary digital signal can be implemented by means of amplitude modulation at one half the binary signal's bit transmission rate or frequency. Federal Republic of Germany published patent application DT-OS No. 23 39 806 (published Feb. 27, 1975) describes a circuit configuration for modulation of a pulse-code-modulated and pseudoternary-coded signal. The carrier employed is a rectangular pulse train having a bit repetition frequency derived from and equal to one half that of the binary signal. The carrier is derived from the bit repetition frequency of the binary signal by means of a frequency divider. The pseudoternary-coded signal is applied to the first terminal pair of a double push-pull modulator. The second terminal pair of the modulator receives the rectangular carrier signal, the latter having a pulse-duration/pulse-period ratio of 1:2 and one half the bit repetition frequency of the pseudoternary digital signal. The output signal of the modulator is likewise a pseudoternary-coded signal. This prior-art technique requires, as a preliminary, that the pseudoternary-coded input signal be split up into two unipolar pulse trains, one pulse train having only the positive amplitude values and the the pulse train only the negative amplitude values of the pseudoternary input signal. Also, it is necessary to derive from the rectangular carrier signal a further carrier signal which is the complement or logical inversion of the first one. Furthermore, the points where the pulses of the digital input signal and of the carrier signal each bit or leave zero values must be phase-shifted relative to each other by 90°, thus requiring means for maintaining a definite phase relationship between the digital input signal and the carrier signal. Last and not least, the use of a pseudoternary-coded signal as an input signal for such modulator requires means for converting the signal of actual interest, i.e., the original binary signal, into pseudoternary-coded form, in the first place.

Accordingly, the prior-art technique in question, which converts the frequency of the binary signal of interest to a more desirable frequency value by pseudoternary coding, involves considerable expense for implementing circuitry.

SUMMARY OF THE INVENTION

It is a general object of the invention to provide a novel means for more simply, inexpensively and directly converting a binary coded signal of interest into a pseudoternary coded signal, and most especially a pseudoternary coded signal comprised of A.C. pulses.

The present invention utilizes a number of considerations. It is to be noted that the amplitude-modulation technique described above does not represent the one and only way of effecting the requisite frequency conversion of the binary digital signal. In principle, use could be made of a pure encoding scheme, if a suitable encoding scheme and the means to implement it successfully could be found. By selecting a correct encoding scheme, it ought to be possible to convert, rather directly and almost in a single step, the binary coded signal of interest into a corresponding pseudoternary coded signal of higher frequency.

With such a concept in mind, an encoding scheme which I have found to be susceptible to straightforward implementation, i.e., in contrast to the complicated amplitude-modulation technique discussed above, is a scheme set forth by W. K. Weber in the publication "Proceedings of the Zürich-Seminar 1974," (F7). In accordance with that encoding scheme, each "0" bit of a binary coded signal is represented by a "0" level of the pseudoternary coded signal to be produced, the pseudoternary signal having the three levels $-1$, $0$ and $+1$. In contrast, each "1" bit of the binary signal is represented by two half-bits of the pseudoternary coded signal, the two half-bits each having a duration one half the duration of one bit of the binary signal, and each such pair of half-bits in the pseudoternary signal being of opposite polarity. Thus, in the pseudoternary signal, a "1" bit of the original binary signal can be represented by a half-bit at logic level +1 followed by a half-bit at logic level −1. Alternatively, each "1" bit of the original binary signal can be represented by a half-bit at logic level −1 followed by a half-bit at logic level +1. In accordance with the Weber encoding scheme, the "1" bits of the original binary signal are sometimes represented, in the pseudoternary signal, by a +1 half-bit followed by a −1 half-bit, and sometimes represented by a −1 half-bit followed by a +1 half-bit. Which of these two alternative forms of representation is used for any particular "1" bit to be represented, is dependent upon the number of "0" bits occuring between successive "1" bits. If a "1" bit of the binary signal is represented by a particular half-bit combination (e.g., −1 followed by +1), and if such "1" bit is followed by an even number of "0" bits and then by the next "1" bit, then such next "1" bit is represented by the same half-bit combination (i.e., −1 then +1) as such preceding "1" bit. If a "1" bit of the binary signal is represented by a particular half-bit combination (e.g., −1 then +1), and if such "1" bit is followed by an odd number of "0" bits and then by the next "1" bit, such next "1" bit is represented by the other of the two possible half-bit combinations (i.e., would be represented by a +1 and then a −1). If a "1" bit is not immediately followed by any "0" bit, and instead the next bit is itself a "1" bit, the number of intervening "0" bits is considered even, and such immediately following "1" bit is represented by the same half-bit combination as its immediate predecessor "1" bit. If a pseudoternary coded signal embodying this encoding scheme can be practically enough developed, then it can be converted back to the original binary signal by merely passing it through a rectifier; each "0" bit of the pseudoternary signal is represented by a ternary "0" level, and the half-bit combination (whether −1, +1 or +1, −1) will, upon rectification, convert directly to a binary "1" bit.

In accordance with the presently preferred embodiment of the invention, such an encoding scheme is physically implemented, by applying the binary signal to be converted to the input of a clocked pulse former stage. The pulse former stage serves to establish definite phase relationships between a modified version of the binary signal and the clock signal employed. The output signal of the pulse former stage is applied to a logic-gate circuit and also to a control signal circuit. The latter responds to the number of bits of predetermined value in the binary signal and produces a control signal dependent thereon. The control signal is fed to the logic gate circuit, and the latter, in dependence upon the control signal, converts the binary signal which it receives into the desired pseudoternary coded signal.

By developing the pseudoternary coded signal in this way, use can be made of a relatively small number of elementary circuit components.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
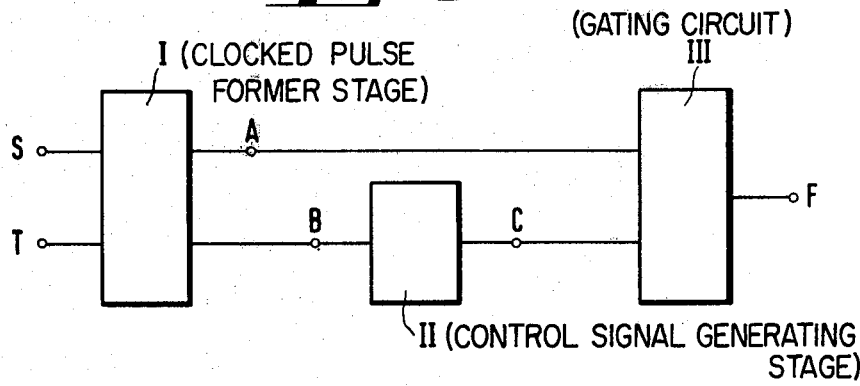
FIG. 1 depicts the general configuration of a circuit embodying the present invention and operative for converting a binary coded signal into a pseudoternary coded signal.

The circuit configuration depicted in FIG. 1 comprises a clocked pulse former stage I, a control signal generating stage II and a gating circuit III. The first output A of pulse former stage I is connected to one input of gating circuit III, whereas the second output B of pulse former stage I is connected to the input of control signal generating stage II. The latter produces at its output C a control signal, which is applied to a second input of gating stage III to control the operation of the latter. The signal input S of pulse former stage I receives a binary coded signal which is to be converted into pseudoternary coded form. The clock input T of clocked pulse former stage I receives a clock signal having the form of a binary rectangular pulse train. The pseudoternary coded version of the binary input signal is produced at the output F of gating circuit III, it comprises A.C. pulses, and it has a frequency, i.e., a signal element transmission rate, higher than the repetition frequency of the clock pulse train at T.

Figure 2:
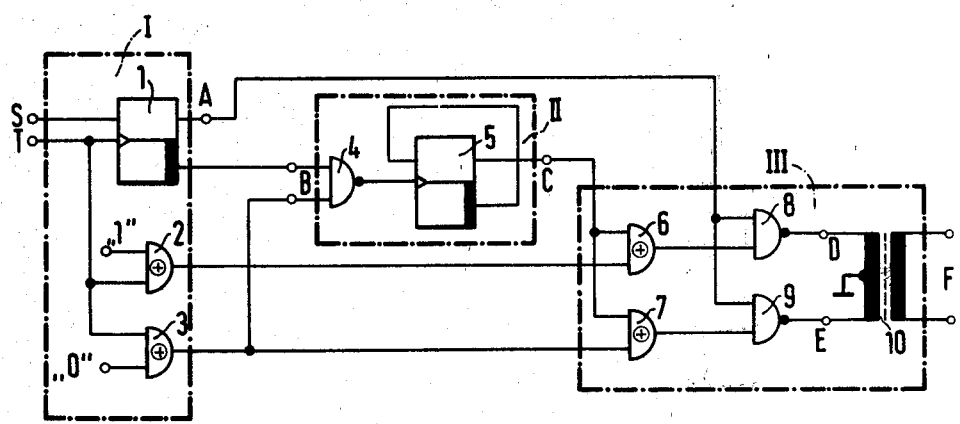
FIG. 2 depicts one representative, and presently preferred circuit in accordance with the generalized configuration of FIG. 1.

FIG. 2 depicts one representative, and presently preferred specific circuit embodying the general circuit configuration set forth in FIG. 1. This circuit comprises a flip-flop 1 and two EXCLUSIVE-OR gates 2, 3. The signal input S is connected to the first data input of flip-flop 1, and the clock input T is connected to the clock signal input of the flip-flop. First inputs of the two EXCLUSIVE-OR gates 2, 3 are both connected to the clock signal input T. The second input of EX-OR gate 2 is in permanent receipt of a logical "1" signal, whereas the second input of EX-OR gate 3 is in permanent receipt of a "0" signal. The first output A of flip-flop 1 is directly connected to the first inputs of two NAND-gates 8, 9, these two gates, along with two further EX-OR gates 6, 7 and an output transformer 10, forming the gating circuit III of FIG. 1. The second output of flip-flop 1 is connected to the first input of a NAND-gate 4 which, along with a flip-flop 5 discussed below, forms the control signal generating stage II of FIG. 1. The outputs of the two EX-OR-gates 2, 3 are connected to the first inputs of respective ones of the two EX-OR gates 6, 7. The second input of NAND-gate 4 is connected to the output of EX-OR gate 3. The output of NAND-gate 4 is connected to the clock signal input of flip-flop 5. The first output C of flip-flop 5 is connected to the second inputs of both EX-OR gates 6, 7. The second output of flip-flop 5 is connected to the first data signal input thereof. The outputs of the two EX-OR-gates 6, 7 are connected to the second inputs of respective ones of the two NAND-gates 8, 9. The outputs D, E of the latter are connected to respective end terminals of the primary winding of an output transformer 10, across whose secondary winding the pseudoternary coded signal sought appears, at F.

Figure 3:
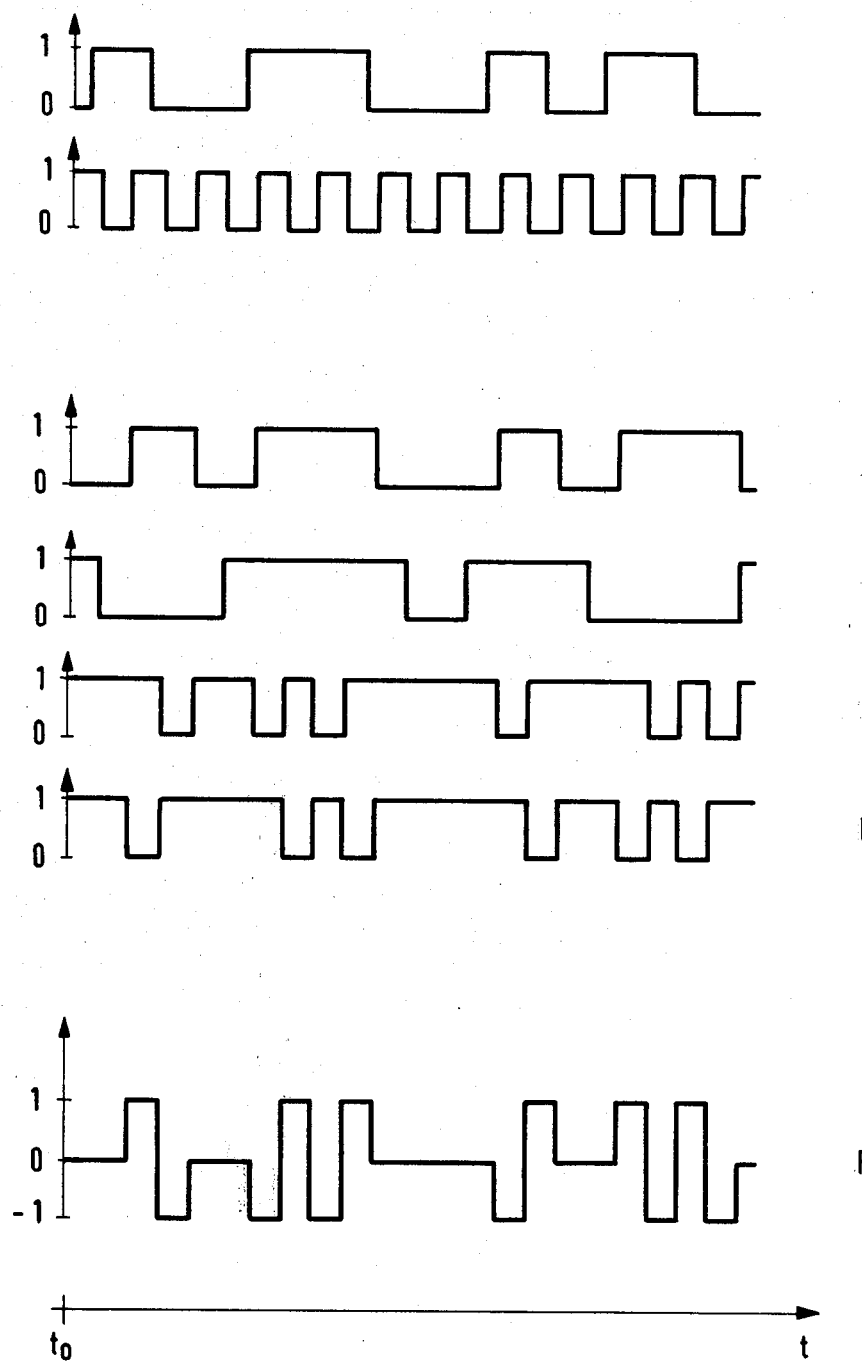
FIG. 3 is a pulse diagram depicting the input and output pulse trains at various points in the circuit of FIG. 2.

FIG. 3 depicts the pulse trains present at the indicated points of the circuitry of FIG. 2, including the binary input signal S, the clock pulse train T, the binary signal A produced at the output of the pulse former, the output signal C of flip-flop 5, the output pulse trains D and E of the NAND-gates 8 and 9, and the pseudoternary coded output signal F of the circuit.

The circuit of FIG. 2 operates as follows:

Clock pulses T are applied to the clock signal input of flip-flop 1. The positive-going or leading flank of each clock pulse causes the present logic value ("0" or "1") of the input binary signal S to be registered at the first output A of flip-flop 1, with the logical complement thereof being registered at the second output of flip-flop 1.

As will be seen by comparing the input signal S and the clock pulse train T in FIG. 3, the period of the clock pulses is equal to the bit duration of the binary signal S, and the duration of each clock pulse is one half the period of the clock pulses. As shown in FIG. 3, the output signal A of the clocked pulse former stage is a binary signal, the constituent "0" and "1" bits of which are the same as those of the input binary signal S. The purpose of the clocked pulse former stage I is to establish a rigid phase relationship between the binary input signal and the clock pulse train.

Looking ahead to the pseudoternary output pulse train F, and comparing it to the phase-synchronized version A of the input binary signal S, the following will be noted. Each "0" bit of binary signal A is represented, in the pseudoternary coded signal F, by the ternary logic level "0". Each "1" bit of the binary signal A is represented, in the pseudoternary signal F, by an A.C. pulse consisting of a half-bit of ternary logic level "+1" plus one half-bit of ternary logic level "−1". Whereas each "0" bit of the pseudoternary signal F has a duration simply equal to the period of the clock pulse train T, each two half-bits of the ternary signal F each have a duration equal to one half the period of clock pulse train T. In the illustrated sequence of bits of input signal S and the phase-synchronized version A thereof, the first bit is a "0", and is represented in signal F by ternary level "0". The scond bit is a "1" and is represented in signal F by a ternary "+1" followed by a ternary "−1". The third bit of the binary signal A is a "0" and is represented in signal F by ternary level "0". The fourth bit of the binary signal A is a "1" and is represented in signal F by a ternary "−1" followed by a ternary "+1", i.e., unlike the pseudoternary representation of the first "1" bit occurring in signal A. The fourth bit of signal A is another "1" bit, and is represented in signal F by a ternary "−1" followed by a ternary "+1". And so forth. It will be seen that, if the pseudoternary coded signal F is passed through a rectifier (i.e., with the ternary logic level "0" corresponding to zero volts, and with the ternary logic levels "−1" and "+1" corresponding to, e.g., −1 volt and +1 volt, respectively), the rectified version of signal F will be identical to binary signal A itself.

Whether any particular "1" bit of binary signal A is represented, in signal F, by a "+1" level followed by a "−1" level, or instead by a "−1" level followed by a "+1" level, depends upon the number of "0" bits which immediately preceded the "1" bit in question. If a particular "1" bit of binary signal A had been immediately preceded by an even number of "0" bits, then such "1" bit is represented by the same combination of ternary levels as was used to represent the most recently preceding "1" bit of binary signal A. If a particular "1" bit of binary signal A has been immediately preceded by an even number of "0" bits, then such "1" bit is represented not by the same combination of ternary levels as was used to represent the most recently preceding "1" bit of signal A, but instead is represented by the other of the two possible representations.

As shown in FIG. 3, it is assumed that, at time to, pseudoternary coded signal F is at ternary level "0". This represents the first "0" bit of binary signal A.

The first "1" bit shown in signal A (the second illustrated bit thereof) is represented, in signal F, by the half-bit combination +1, −1.

The next bit of signal A is a "0", and is represented, in signal F, by ternary level "0", as are all "0" bits of signal A.

The second "1" bit shown in signal A (the fourth illustrated bit thereof) is represented, in signal F, by the half-bit combination −1, +1. This second "1" bit of signal A was immediately preceded by only a single "0" bit in signal A, i.e., an odd number of successive "0" bits in signal A. Therefore, this second "1" bit in signal A is represented, in signal F, not by the half-bit combination (+1, −1) used to represent the preceding "1" bit, but instead by the other of the two half-bit combinations (namely, −1, +1).

The third "1" bit shown in signal A (the fifth illustrated bit thereof) is represented, in signal F, by the half-bit combination −1, +1, i.e., is represented by the same half-bit combination as the preceding "1" bit of signal A. This third "1" bit of signal A was immediately preceded by no "0" bit in signal A; this is to be considered an even number of "0" bits. Therefore, the third "1" bit in signal A is represented, in signal F, by the same half-bit combination as was used to represent the preceding "1" bit of signal A.

The fourth "1" bit shown in signal A (the eighth illustrated bit thereof) is represented, in signal F, by the half-bit combination −1, +1, i.e., the same half-bit combination as was used for the third "1" bit of signal A, because this fourth "1" bit was immediately preceded by an even number of "0" bits (in particular, two "0" bits).

The fifth "1" bit of signal A is represented by the half-bit combination +1, −1, because it was immediately preceded by an odd number of "0" bits in signal A, namely, only one "0" bit.

Returning to FIG. 2, it will be noted that the output pulse train of EX-OR-gate 3 is identical to the clock pulse train T, whereas the output pulse train of EX-OR-gate 2 is the logical inversion of clock pulse train T. In particular, each "1" pulse of clock pulse train T results in a "1" pulse of equal duration at the output of EX-OR-gate 3, because the lower input of gate 3 is in constant receipt of a "0" signal. In contrast, each "1" pulse of clock pulse train T results in a "0" pulse of equal duration at the output of EX-OR-gate 2, because the upper input of gate 2 is in constant receipt of a "1" signal. As shown in FIG. 3, the pulse duration of clock pulse train T is equal to one half the period thereof. Accordingly, the "1" pulses produced at the output of EX-OR-gate 2 are of the same duration as the "1" pulses produced at the output of EX-OR-gate 3, although phase-shifted by 180° relative thereto.

This logical inversion of the clock pulse train T (produced at the output of EX-OR-gate 2) is used to be able to generate pulse trains (namely pulse trains D and E in FIG. 3) whose constituent signal elements have one half the bit duration of the constituent bits of binary signal A. These half-bit signal elements of pulse trains D and E can then be combined to form the two different half-bit combinations (+1, −1 and −1, +1) used, in signal F, to represent the "1" bits of signal A.

In the particular circuit depicted in FIG. 2, the two EX-OR-gates 2, 3 are employed to assure that the pulses of the inverted version of the clock pulse train T hit and leave binary level "0" at the same times as do the pulses of non-inverted version of the clock pulse train. If the inverted version of the clock pulse train T were produced by simplying applying the pulses T to an elementary inverter element (a NOT-gate), then the transmission time inherent in the use of such NOT-gate would lead to a less than perfect 180° phase difference as between the clock pulse train T and the inverted version thereof. In order to assure that pulse train T and the inversion thereof are exactly 180° phase shifted relative to each other, it is presently preferred that the two EX-OR-gates 2, 3 of FIG. 2 (or other gates performing an equivalent function) by provided on a shared integrated-circuit substrate. In this way, it can be assured that the clock pulse train produced at the output of gate 3 and the inverted version thereof produced at the output of gate 2 will exhibit identical time delays relative to the clock pulse train T applied to the clock-signal input of flip-flop 1.

As already stated, the pseudoternary coded output signal F is composed from the two pulse trains D and E shown in FIG. 3, the half-bit combinations (+1, −1 and −1, +1) of signal F, in particular, being assembled from the half-bit-duration pulses of pulse trains D and E. In order that the leading and trailing flanks of the pulses in trains D and E, and especially of the half-bit-duration pulses, perfectly join each other in the formation of pulse train F, the two EX-OR-gates 6, 7 are, like gates 2, 3, preferably provided on a shared integrated-circuit substrate.

NAND-gate 4 receives at its lower input the clock pulse train T (i.e., via EX-OR-gate 3), and at its upper input receives the logical inversion or complement of the binary pulse train T (whose relationship to the binary input signal S has already been explained). Accordingly, NAND-gate 4 produces an output "1" signal in response to each "0" bit of binary signal A (or S). In particular, if a "0" bit of binary signal A is immediately followed by one or more "1" bits, then the "1" signal produced at the output of NAND-gate 4 in response to such "0" bit persists during such one or more subsequent "1" bits. In contrast, if a "0" bit of binary signal A is immediately followed by one or more further "0" bits, then NAND-gate 4 produces one distinct output "1" pulse in response to the first such "0" bit, another distinct output "1" pulse in response to the next such "0" bit, and so forth.

The output "1" pulses produced by NAND-gate 4 are counted by flip-flop 5; the signal produced at output C of flip-flop 5 is shown in FIG. 3. This signal changes level in response to each and every "0" bit of binary signal A, but is not responsive to the "1" bits of signal A. In particular, flip-flop output signal C assumes level "1" in response to an even-numbered "0" bit of signal A, and assumes level "0" in response to an odd-numbered "0" bit of signal A. In FIG. 3, the first illustrated "0" bit of signal A is an odd-numbered bit, and signal C responds to it by assuming binary level "0". The second illustrated "0" bit of signal A is an even-numbered bit, and signal C responds to it by assuming binary level "1", and persists at level "1" until the next "0" bit of signal A. The third illustrated "0" bit of signal A is an odd-numbered bit, and signal C responds to it by assuming binary level "0". The fourth illustrated "0" bit of signal A is an even-numbered bit, and signal C responds to it by assuming binary level "1", and persists at level "1" until the next "0" bit of signal A. And so forth.

As shown in FIG. 2, flip-flop output signal C is applied to the upper inputs of the two EX-OR-gates 6, 7. The lower input of EX-OR-gate 7 receives the clock pulse train T, whereas the lower input of EX-OR-gate 6 receives the inverted version of clock pulse train T. When signal C is at binary level "0", the two EX-OR-gates 6, 7 merely transmit to their respective outputs the pulse trains which they respectively receive at their lower inputs. When signal C is at binary level "1", the two EX-OR-gates 6, 7 transmit to their respective outputs inverted versions of the pulse trains which they receive at their respective lower inputs.

The output pulse trains from EX-OR-gates 6, 7 are respectively received by the lower inputs of NAND-gates 8, 9. Thus when flip-flop output signal C is a "1", the lower input of gate 8 receives the clock pulse train T and the lower input of gate 9 the inverted version thereof, and vice versa when signal C is at level "0". The upper inputs of the two NAND-gates 8, 9 both receive the binary signal A to be converted into pseudoternary coded form. As shown in FIG. 3, for both pulse train D and pulse train E, the pulse train is at binary level "1" during each and every "0" bit of binary signal A. During each "1" bit of binary signal A, pulse trains D and E each drop down to binary level "0" for one half the duration of the "1" bit of signal A. Sometimes pulse train D drops down to "0" level during the first half of such "1" bit of signal A, with pulse train E dropping down to "0" level during the second half of that "1" bit; other times, pulse train E drops down to "0" level during the first half of the "1" bit of signal A, with pulse train D dropping down to "0" level during the second half of that "1" bit. Which of the two signals D, E drops down to "0" level during which half of each "1" bit of signal A is determined by whether the most recently preceding "0" bit of signal A was an odd- or even-numbered "0" bit. Thus, in FIG. 3, the first illustrated "1" bit of signal A was preceded by the first (an odd-numbered) "0" bit of signal A, and therefore during this "1" bit of signal A it is first the signal E which drops to "0" level for a half-bit duration and then signal D. In FIG. 3, the fourth illustrated "1" bit of signal A was preceded by the fourth (an even-numbered) "0" bit of signal A, and therefore during this "1" bit of signal A it is first the signal D which drops to "0" level for a half-bit duration and then signal E.

These pairs of half-bit-duration "0" pulses of pulse trains D, E are combined by output transformer 10 to form the pseudoternary output signal F, already described.

As will be seen in FIG. 3, which half-bit combination (+1, −1 or −1, +1) is used, in signal F, to represent each "1" bit of signal A (or S) can alternatively be said to depend not upon whether the total number of preceding "0" bits of signal A was even or odd (i.e., involving counting of "0" bits from t=minus infinity) but, equally well, to depend merely upon the number of "0" bits of signal A which intervened between the "1" bit now to be represented and the previously represented "1" bit of signal A. Thus, in actuality, the circuit is not dependent upon the total previous history of its own operation, but instead upon a much shorter interval of its previous history. Accordingly, if, for any reason, a bit error occurs in any of the intermediate binary pulse trains involved, the consequences of such error will not persist indefinitely. Furthermore, if, as already stated, the output pulse train F is passed through a rectifier, then both its constituent half-bit combinations (+1, −1 and −1, +1) will convert back, identically, into ordinary, one-bit-duration binary "1" pulses, i.e., so as to reconstitute the binary signal A.

It will be understood that each of the elements described above, or two or more together, may also find a useful application in other types of circuits and procedures differing from the types described above.

While the invention has been illustrated and described as embodied in particular circuit configurations used to implement the conversion of a binary coded input signal into a pseudoternary coded version thereof in accordance with a particular encoding scheme, it is not intended to be limited to the details shown, since various modifications and structural changes may be made without modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A circuit arrangement for converting a binary pulse train into a pseudoternary A.C. pulse train comprising in combination, first and second clocked flip-flips, each having a clock signal input, a first-state input, a first-state output, and a second-state output, first, second, third and fourth EXCLUSIVE-OR-gates each having an output and first and second inputs, first, second and third NAND-gates each having an output and first and second inputs, the first-state input of the first flip-flop being connected to receive the binary pulse train, the first inputs of the first and second EXCLUSIVE-OR-gates being connected to receive the same clock pulse train as the clock signal input of the first flip-flip, means constantly applying a "1" signal to the second input of the first EXCLUSIVE-OR-gate and constantly applying a "0" signal to the second input of the second EXCLUSIVE-OR-gate, the first NAND-gate having its first input connected to the second-state output of the first flip-flop and its second input to the output of the second EXCLUSIVE-OR-gate, the output of the first NAND-gate being connected to the clock signal input of the second flip-flop, the second-state output of the second flip-flop being connected to the first-state input of the same, the first-state output of the second flip-flop being connected to the first inputs of the third and fourth EXCLUSIVE-OR-gates, the second inputs of the third and fourth EXCLUSIVE-OR-gates being respectively connected to the output of the first EXCLUSIVE-OR-gate and of the second EXCLUSIVE-OR-gate, the first inputs of the second and third NAND-gates being connected to the first-state output of the first flip-flop, the second inputs of the second and third NAND-gates being respectively connected to the output of the third EXCLUSIVE-OR-gate and of the fourth EXCLUSIVE-OR-gate, and furthermore including a transformer having a primary winding connected between the outputs of the second and third NAND-gates.

2. A circuit arrangement for converting a binary pulse train into a pseudoternary A.C. pulse train, comprising, in combination, clocked pulse-forming means having an input for receipt of the binary pulse train and a further input for receipt of a clock pulse train and operative for producing at least one output binary pulse train corresponding to the input pulse train and synchronized to the phase of the clock pulse train, the clocked pulse-forming means including a clocked flip-flop having a data signal input for receipt of the input binary pulse train and having a clock signal input for receipt of the clock pulse train, and two logic gates each receiving the clock pulse train and producing at their outputs an inverted version and a non-inverted version of the clock pulse train, both the inverted and non-inverted versions of the clock pulse train having the same time delay relative to the clock pulse train; control signal generating means receiving a phase synchronized binary pulse train from the pulse-forming means and operative for producing a control signal dependent upon the bit content of the received phase synchronized binary pulse train, the control signal generating means comprising means receiving a phase synchronized binary pulse train from the flip-flop and also receiving one of said versions of the clock pulse train and operative for producing said control signal in dependence upon the number of bits of a predetermined binary logic level present in the phase synchronized binary pulse train received from the flip-flop, the means producing said control signal in dependence upon the number of bits of a predetermined logic level comprising means producing said control signal in dependence upon whether the number of bits of a predetermined logic level is an odd or an even number, the means producing said control signal in dependence upon whether the number of bits of a predetermined logic level is an odd or an even number comprising a second clocked flip-flop having a data signal input and a clock signal input and having first and second, mutually complementary outputs, the control signal being produced at the first output of the second flip-flop, the second output of the second flip-flop being connected to the data signal input of the second flip-flop and further including a logic gate having an output connected to the clock signal input of the second flip-flop and having two inputs of which one is connected to receive one of said versions of the clock pulse train and the other to receive a phase synchronized binary pulse train from the first flip-flop; and gating circuit means receiving the control signal from the control signal generating means and a phase synchronized binary pulse train directly from the pulse-forming means and operative in dependence upon the control signal for converting the directly received binary pulse train into a pseudoternary A.C. pulse train.

3. A circuit as defined in claim 2, the gating circuit means comprising two logic gates each having a first input receiving the control signal and having respective second inputs which receive respective ones of said versions of the clock pulse train and each operative for transmitting the respective version of the clock pulse train in inverted or non-inverted form depending upon said control signal, two further logic gates having first inputs connected to respective outputs of the two logic gates recited just above and having second inputs which receive a phase synchronized binary pulse train from the output of the flip-flop, and means connected to the outputs of said two further logic gates and operative for combining the output signals therefrom to form the pseudoternary A.C. pulse train.

4. A circuit as defined in claim 2, said combining means being a transformer.

* * * * *